(No Model.)

T. ELLIS.
STEERING APPARATUS.

No. 493,692. Patented Mar. 21, 1893.

Witnesses
Fred A. Mason
C. O. Mason

Inventor
Thomas Ellis
by J. W. Mason
Atty.

UNITED STATES PATENT OFFICE.

THOMAS ELLIS, OF ROCHESTER, MASSACHUSETTS.

STEERING APPARATUS.

SPECIFICATION forming part of Letters Patent No. 493,692, dated March 21, 1893.

Application filed July 27, 1892. Serial No. 441,349. (No model.)

*To all whom it may concern:*

Be it known that I, THOMAS ELLIS, a citizen of the United States, residing at Rochester, in the county of Plymouth and State of Massachusetts, have invented certain new and useful Improvements in Apparatus for Steering Ships, of which the following is a specification.

The object of my invention is to provide a ship with means whereby its bow or stern may be moved to starboard or port; or the vessel moved bodily to starboard or port or, turned about, as on a pivot.

To this end, my invention consists in providing the vessel with transverse openings near its keel; mounting propellers in said openings, in such a manner, that their force will be exerted transversely to the line of the keel; and providing them with means to revolve them in the same or opposite direction.

Figure 1:
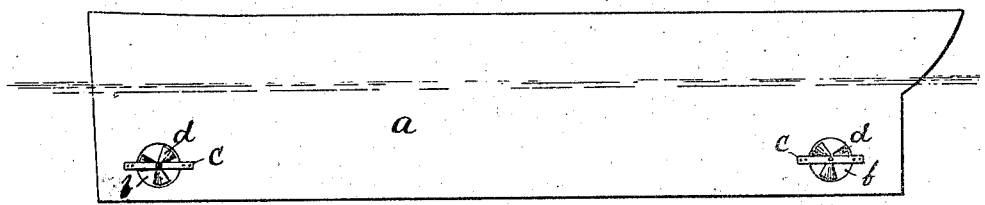
Figure 2:
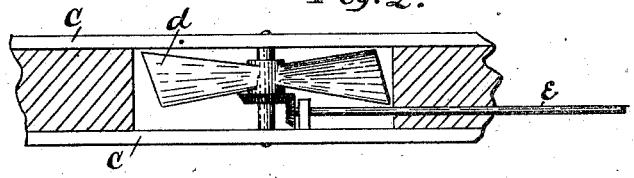
Figure 3:
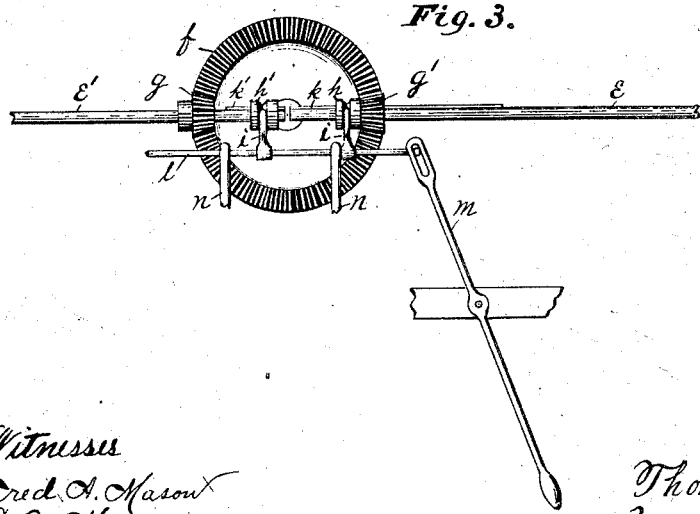

In the accompanying drawings, Figure 1, represents a side view of a vessel, on a small scale, with my improved steering apparatus arranged at bow and stern. Fig. 2, is an enlarged top view of one of the propellers, and showing a part of the vessel in longitudinal section. Fig. 3, represents a view of the device, by means of which motion is communicated to the propeller, and controlled.

Similar letters refer to similar parts, in the several views.

$a$, represents a vessel, having the transverse openings $b$, through its bow and stern.

$d$, $d$, represent propellers, mounted in said openings, and having their bearings in the bars $c$. The propeller shafts, are provided with bevel gears, meshing with gear wheels on the shafts $e$, and $e'$, which shafts are in line with each other, as shown in Fig. 3, and have their inner ends provided with the splines, $k$, and $k'$.

$g$, is a bevel gear, fixed to the shaft $e'$, and meshing with the bevel gear $f$, which gear, receives motion from an engine or other suitable power, and is adapted to have its motion reversed, accelerated, or retarded.

$g'$. is a bevel gear, provided with a collar or hub $h$, and adapted to slide on the shaft $e$, and revolved with it, by means of the spline $k$.

$h'$, is a collar adapted to slide on the end of the shaft $e'$, and be revolved with it, by means of the spline $k'$.

$l$. is a rod, sliding in bearings $n$, $n$, and provided with forks $i$, $i$, which embrace the grooves in the collars $h$, and $h'$.

The rod $l$, is provided with the lever $m$, by means of which the said collars are moved in a longitudinal direction on the shafts $e$, and $e'$.

The operation of the apparatus, is as follows: When it is desired to turn the vessel about, as on a pivot, the lever $m$, occupies the position, as shown in Fig. 3, in which the shafts $e$, and $e'$; and consequently the propellers, would be revolved in opposite directions, and the propellers, would push the bow, to port, and the stern to starboard, or vice versa. When it is desired to move the vessel bodily, to port or starboard, the lever $m$, is moved so as to bring the collar $h'$, over the ends of the shafts $e$, and $e'$, which motion, moves the gear $g'$, from contact with the gear $f$, and the shafts $e$, and $e'$, revolve as one shaft, and cause the propellers to revolve, both in the same direction, thus pushing the vessel, bodily to port or starboard, as the case may be. When it is desired to revolve, only, the propeller moved by the shaft $e'$; the lever $m$, is moved so as to bring the collar $h'$, entirely on the shaft $e$.

I claim—

A marine vessel having transverse openings through the dead wood near the bow and stern; marine screws journaled in said openings, with their shafts at right angles to the keel, said shafts provided with bevel gears adapted to mesh with gears on the ends of the shafts $e$, and $e'$, extending inward to the center of the vessel; a bevel gear $f$, journaled at right angles to said shafts and adapted to receive motion in either direction, from an engine; a bevel gear $g$, fixed to the shaft $e'$, and meshing with the gear $f$; a bevel gear $g'$, having grooved hub $h$, adapted to slide on the shaft $e$, and communicate motion to it by means of the spline $k$, and adapted to mesh with the gear $f$, at certain times; a grooved collar $h'$, adapted to connect the shafts $e$, and $e'$, at certain times; a rod $l$, sliding in bearings and provided with the forks $i$, and $i'$, adapted to embrace the grooves in the collars $h$, and $h'$, and means to operate said rod, whereby the marine screws are caused to revolve in the same, or opposite direction at the will of the pilot, for the purpose as shown and described.

THOMAS ELLIS.

Witnesses:
 HENRY W. MASON,
 FRED A. MASON.